United States Patent
Goldfarb et al.

(10) Patent No.: US 10,485,241 B2
(45) Date of Patent: Nov. 26, 2019

(54) DEVICE FOR APPLICATION OF FLAVORS TO COLLAGEN CASINGS

(71) Applicant: Nitta Casings Inc., Bridgewater, NJ (US)

(72) Inventors: Eugene Goldfarb, Marlboro, NJ (US); David Mathews, Somerville, NJ (US); Masaya Shinoda, Somerset, NJ (US)

(73) Assignee: NITTA CASINGS INC., Bridgewater, NJ (US)

( * ) Notice: Subject to any disclaimer, the term of this patent is extended or adjusted under 35 U.S.C. 154(b) by 424 days.

(21) Appl. No.: 15/130,345

(22) Filed: Apr. 15, 2016

(65) Prior Publication Data

US 2016/0302433 A1 Oct. 20, 2016

Related U.S. Application Data

(60) Provisional application No. 62/148,257, filed on Apr. 16, 2015.

(51) Int. Cl.
*A22C 13/00* (2006.01)
*B05C 3/12* (2006.01)
(Continued)

(52) U.S. Cl.
CPC ...... *A22C 13/0006* (2013.01); *A22C 13/0016* (2013.01); *A22C 2013/0046* (2013.01);
(Continued)

(58) Field of Classification Search
CPC ........... A22C 13/0006; A22C 13/0003; A22C 13/0016; A22C 2013/0046;
(Continued)

(56) References Cited

U.S. PATENT DOCUMENTS 2,622,555 A * 12/1952 Rudolph .............. A21C 15/002
118/13
3,123,653 A 3/1964 Lieberman
(Continued)

FOREIGN PATENT DOCUMENTS

WO 2014066133 A1 5/2014

OTHER PUBLICATIONS

International Search Report for Application No. PCT/US2016/027882 dated Aug. 12, 2016, 4 pages.
(Continued)

*Primary Examiner* — Laura Edwards
(74) *Attorney, Agent, or Firm* — McCarter & English, LLP

(57) ABSTRACT

A device for applying liquid flavors to collagen casing is provided. In one embodiment, the device comprises a cup and a roller for applying liquid flavor to the surface of the collagen casing prior to drying. In another embodiment, the device comprises an applicator having a base plate with a first hole in the base plate to allow the collagen casing to pass through the base plate, a second hole in the base plate in fluid communication with the first hole to inject liquid flavor through the second hole into contact with the collagen casing as it passes through the first hole, a wiper removably attached to the base plate to wipe excess liquid flavor from the surface of the collagen casing, and a liquid flavor injection line attached to the second hole in the base plate. In some embodiments, the cup and roller are combined with the applicator to apply the liquid flavor.

2 Claims, 4 Drawing Sheets

(51) Int. Cl.
    *B05C 5/02* (2006.01)
    *A23B 4/28* (2006.01)
(52) U.S. Cl.
    CPC .............. *A23B 4/28* (2013.01); *A23V 2002/00* (2013.01); *B05C 3/125* (2013.01); *B05C 5/0241* (2013.01); *B05C 5/0245* (2013.01)
(58) Field of Classification Search
    CPC . A23V 2002/00; B29L 2023/002; B05C 3/12; B05C 3/125; B05C 5/0241; B05C 5/0245; A23B 4/052; A23B 4/28; A23B 4/18; B65B 25/067; B65D 81/28; A23L 13/72
    USPC ................ 118/13, 24, 26, 300, 419, 423
    See application file for complete search history.

(56) References Cited

U.S. PATENT DOCUMENTS

| | | | |
|---|---|---|---|
| 3,232,210 A | 1/1966 | Ogle | |
| 3,235,641 A | 2/1966 | McKnight | |
| 3,427,169 A * | 2/1969 | Rose | A22C 13/0003 426/133 |
| 3,535,125 A | 10/1970 | Fagan | |
| 3,821,439 A | 6/1974 | Cohly et al. | |
| 4,356,218 A * | 10/1982 | Chiu | A22C 13/0013 427/355 |
| 4,377,187 A | 3/1983 | Chiu | |
| 4,388,331 A | 6/1983 | Miller | |
| 4,532,858 A | 8/1985 | Hershfeld | |
| 5,820,812 A | 10/1998 | Miller et al. | |
| 6,054,155 A | 4/2000 | Kobussen et al. | |
| 2006/0057258 A1 | 3/2006 | Dinh-Sybeldon et al. | |
| 2015/0296812 A1 | 10/2015 | Battersby et al. | |

OTHER PUBLICATIONS

International Written Opinion for Application No. PCT/US2016/027882, dated Aug. 12, 2016, 5 pages.

* cited by examiner

DEVICE FOR APPLICATION OF FLAVORS TO COLLAGEN CASINGS

This application claims priority pursuant to 35 U.S.C. § 119(e) to U.S. Provisional Patent Application No. 62/148,257 filed on Apr. 16, 2015, the entire contents of which are hereby incorporated by reference.

BACKGROUND OF THE INVENTION

Reconstituted collagen is used in the manufacture of tubular casings for meats, such as sausages. The collagen used in these casings is usually derived from the corium layer of bovine hides. The collagen raw material is comminuted, and mixed with a swelling agent to produce a uniform dispersion from which a continuous tube is formed. The tube is then neutralized by the injection of gaseous ammonia or by contact with a liquid salt solution. The casing is washed in water to remove neutralization salts, plasticized by passing it through successive liquid baths and dried while inflated. Examples of such processes are disclosed in U.S. Pat. Nos. 3,535,125, 3,821,439, 4,388,331, and 5,820,812, the entire contents of each of which are hereby incorporated by reference.

It is desirable in some cases to apply flavorings to the casings to provide a desired flavor to the meat product. For example, it may be desirable to flavor a collagen casing with a composition typically referred to as smoke flavor to impart a "smoked" flavor and aroma to the meat product. The present invention is directed to a device that may be used to apply liquid flavors, such as smoke flavor, to collagen casings to be used with meat products, and methods of applying liquid flavors to collagen casings using the device.

SUMMARY OF THE INVENTION

Edible collagen tubular casing is produced using conventional techniques. The final collagen casing product is treated by applying a liquid flavor, such as smoke flavor, on the surface of the collagen casing. The liquid flavor is applied to the surface using an applicator that applies the liquid flavor. The liquid flavor may be a water based solution or an oil based solution. Where a water based flavor solution is used, the liquid flavor is typically applied before the inlet to the final dryer in the casing production process. An oil based flavor solution is typically applied after the final dryer and before shirring and reeling.

The flavor applicator provides means to apply the liquid flavor to the surface of the collagen casing. Flavor is injected into an applicator where the surface of the collagen casing is covered with the liquid flavor. Excess liquid flavor may be wiped from the surface of the collagen casing by a wiper, such as a felt wiper, and collected in a drip cup. In one embodiment, the collagen casing is fed through the drip cup where the surface collagen casing may be coated with the liquid flavor in the drip cup to apply additional liquid flavor to the casing.

Among the advantages of the process are that a flavored collagen casing is produced in which the flavor is longer lasting and survives additional processing steps. The applicator provides a means for applying the flavor efficiently and with minimal waste. Other advantages of the process and resulting product will be apparent to those skilled in the art based upon the description of embodiments of the invention set forth below.

DESCRIPTION OF EMBODIMENTS OF THE INVENTION

The present invention is directed to application of liquid flavorings, such as smoke flavor, to collagen casings. The flavors may be applied as water based solutions or oil based solutions. In one embodiment, the flavor is a water based smoke flavor. It should be understood that the present invention is not limited to application of water based smoke flavor, and that other types of flavors may be applied to a collagen casing using the present invention in the manner described below.

Conventional processes for producing edible collagen casing are known and have been described, for example, in U.S. Pat. No. 5,820,812, the entire contents of which are hereby incorporated by reference. The steps and equipment used in one embodiment of a typical process is shown schematically in FIG. 1. The present invention is not limited in this regard, and collagen casing made by any process can be treated by applying the polysorbate and vegetable oil mixture described herein.

Figure 1:
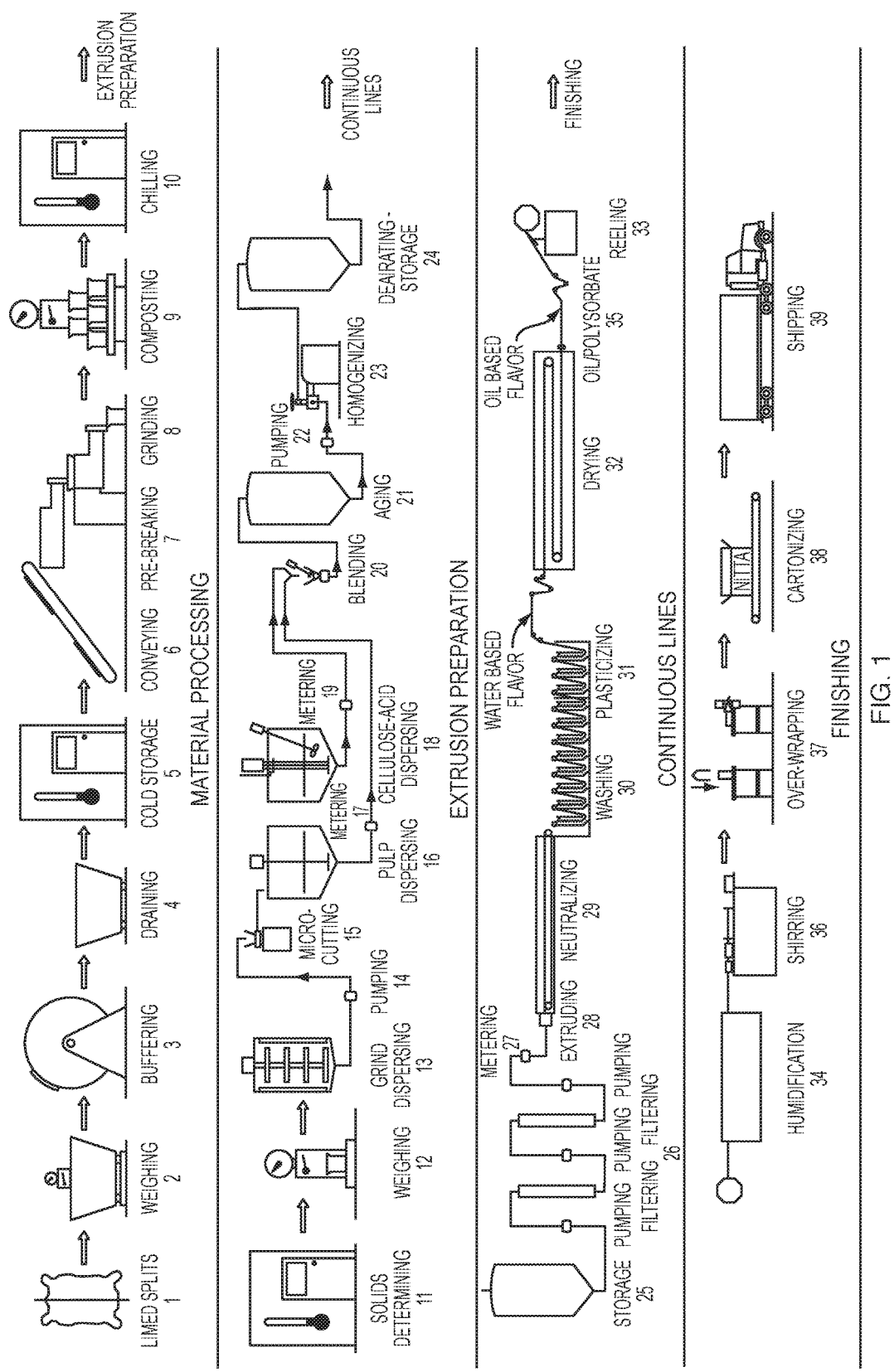
FIG. 1 is a schematic showing one embodiment of a process by which limed hides are processed into edible collagen casings, and showing application of flavor to the collagen casing prior to drying.

In one typical process for producing collagen casings, animal hides from freshly slaughtered animals are de-fleshed, washed with water, and treated with lime to remove hair. The lime treated animal hides are split on a leather splitting machine to separate the grain layer from the corium layer, which is used to produce the collagen casings. "Hides" is used in the following description to refer only to the corium collagen layer that is used to produce the collagen casings. Referring to FIG. 1, the limed hides 1 are stored in a refrigerated storeroom that is maintained at 0-4° C. until further processed as described below.

The hides are first processed to prepare the hide material for extrusion into casings. The hides are weighed 2 and treated in a buffering drum 3, which is capable of handling up to 3000 Kg of product. In the buffering drum, the hides are first treated with an ammonium sulfate solution at a concentration in the range of about 0.5%-2.2% (w/w), then water washed. The hides are then further treated with a citric acid/sodium citrate solution having a concentration of about 0.0725-0.29% (w/w), followed by another water wash. The buffering process brings the pH of the corium layer down to approximately 4.3 to 4.9. Assays are run to ensure the product reaches the appropriate pH. The buffered hides are drained 4 and the buffered hides are placed in cold storage 5 until needed for further processing.

When additional material is needed for processing, the hides are sent on a conveyor 6 to be shredded 7 and ground 8 into a quarter grind (i.e., a material having a particle size of about one-quarter inch) at less than approximately 25° C. The quarter grind material is composited 9 and chilled 10 and maintained at a temperature of about 18° C.

The chilled quarter grind material is piped to the extrusion preparation line. The solids are measured 11 and weighed 12 and the quarter grind particles are dispersed in water 13. The dispersed quarter grind is pumped 14 to a high speed cutting mill 15 where the hide particles are further shredded to form a hydrated mass. The hydrated mass is stored and kept mixed in a pulp dispersion tank 16. In a separate blending tank 18, a dispersion of cellulose, HCl and water at 0 to 10° C. is prepared. In one embodiment, the dispersion is prepared at 5° C.

A quantity of the hydrated quarter grind particles from the pulp dispersion tank 16 is metered 17 into a blender 20. At the same time, a quantity of the cellulose-acid dispersion from blending tank 18 is metered 19 into the blender 20 and blended with the hydrated quarter grind particles to form a gel product. After an initial blend period of about 15 to 60 minutes, the gel product is stored in an aging tank 21 for about 20 hours under vacuum. The temperature of the storage tank is maintained at less than 20° C. The gel product is then pumped 22 to a homogenizer 23 and sent to a storage tank 24 where it is deaerated under vacuum. The gel product so obtained has the following approximate composition:

| Ingredient | Percent |
| --- | --- |
| Hide Solids | 4.2 to 5.3 |
| Cellulose | 0.90 to 1.70 |
| Hydrochloric Acid | 0.20 to 0.24 |

The gel product is maintained in storage tank 25 at about 25° C. The gel product is pumped from the storage tank through a series of filters 26, which may be any appropriate type of filter. Automatic self cleaning filters may be used. The filtered gel product is metered 27 to the extruder 28 to form the collagen casing. The extruder is preferably a disk extruder. At the extruder, the gel is extruded to a thickness from 0.075 to 1.2 thousands, formed, and inflated pneumatically to the desired diameter, typically about 13-34 mm. The collagen casing is treated with anhydrous ammonia in the neutralizing section 29. The ammonia reacts with and neutralizes the HCl in the product and causes coagulation of the collagen. The neutralized collagen casing is washed in a fresh water bath 30 to remove ammonia salts. The washed collagen casing then travels through a series of baskets 31 containing the plasticizer. The plasticizer solution is an aqueous solution containing about 2% to 6% glycerin, about 0.20% to 1.6% sodium carboxymethylcellulose or sodium alginiate, and about 0 to 20 ppm sodium hypochlorite. This process dehydrates the casing for drying purposes and allows introduction of glycerin for elasticity purposes.

Where a water based flavor solution is being applied to the collagen casing, such as a water based smoke flavor, the liquid flavor is applied to the collagen casing after the washing and plasticizing steps, and before the casing is sent through the dryer 32. The water based liquid flavor may be applied using all or part of the device shown in FIG. 2 as described in detail below.

The collagen casing travels through a dryer 32, which uses dry heat up to 205° F. The dryer may have multiple stages at different temperatures. After drying, the collagen casing is sent through a humidification chamber (not shown) at approximately 85% relative humidity.

Where an oil based flavor solution is used, it is applied after the drying step and before the collagen casing is collapsed and wound on the reel. As discussed below, oil based liquid flavors are applied using a felt applicator only.

The collagen casing is collapsed and wound on a reel 33 run through a second humidification chamber where final moisture is added to the casing. The casing is then sent for finishing and shipment.

During the finishing process, moisture is added back to the casing by humidification 34. Then the product is shirred 36 to its specified length and placed in boxes that are over wrapped and vacuum packed 37.

The finished collagen casings are then boxed into FDA approved cardboard boxes 38, which are labeled, bar coded and scanned into the company's lot control system for traceability purposes. The ventilated boxes of slugs may then be placed in a humidification chamber, where forced humidified air is used to bring the moisture content of the product within specifications.

Figure 2:
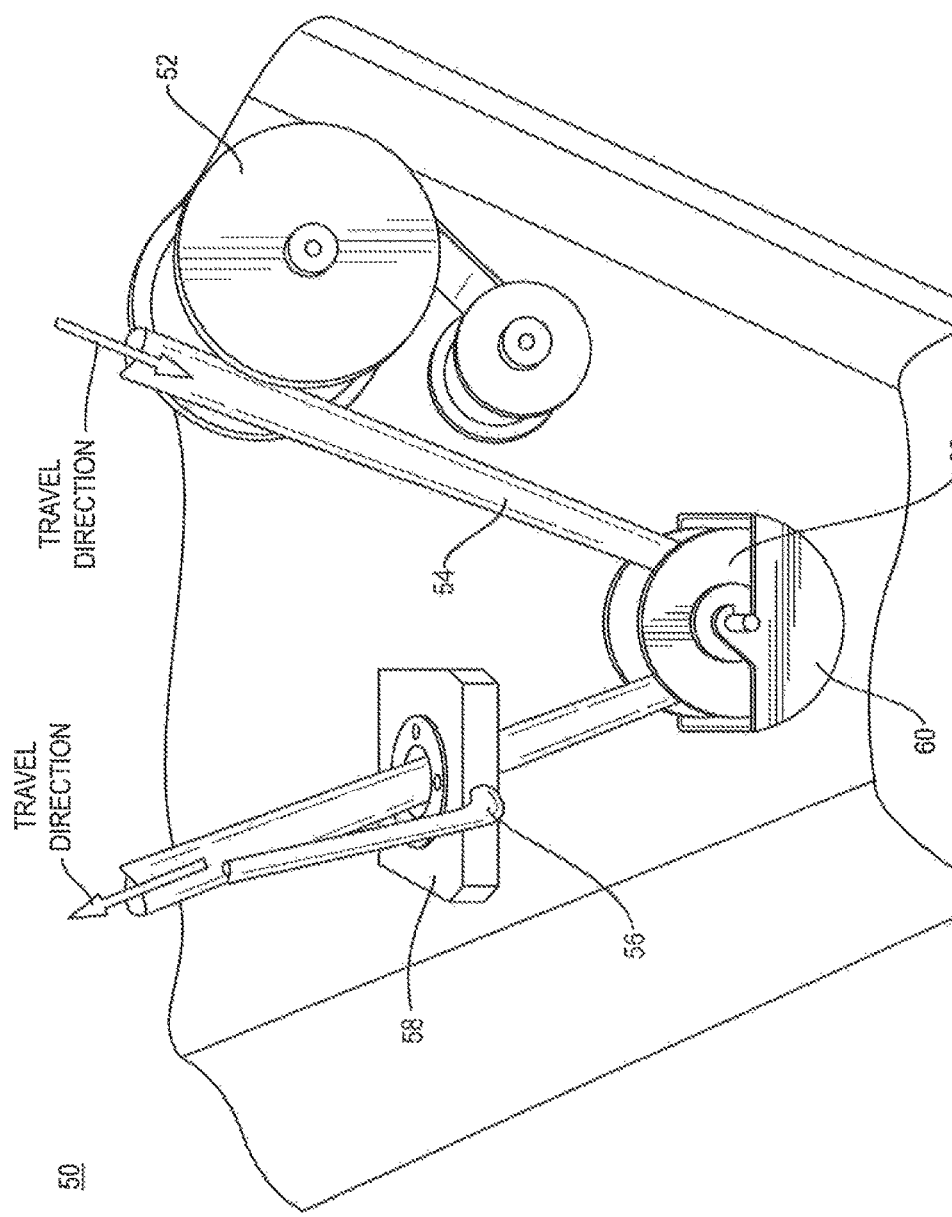
FIG. 2 is a diagram showing an embodiment having an applicator and drip cup for applying flavors to the surface of a collagen casing.

One embodiment of a system for applying the liquid flavor is shown in FIG. 2. The system 50 includes a roller 52, a flavor injection line 56, an applicator 58, a cup 60, a feed line (not numbered), the feed line for feeding the light flavor into the cup, and a wire roller 62. The collagen casing is fed over roller 52 in the direction indicated by the arrows in FIG. 2. The collagen casing is fed through cup 60 under wire roller 62 and then through applicator 58. The collagen casing is fed at a rate of between about 80 feet/minute and 120 feet/minute.

The liquid flavor is injected through line 56 into applicator 58 where it contacts the surface 54 of the collagen casing. Excess flavor is wiped from the surface of the collagen casing by wipers in the applicator 58 and drips into cup 60, where it is collected. The flavor injection line 56 is fed by a variable speed pump (not shown), which controls the level of liquid in the cup 60.

When passing through the drip cup 60, the collagen casing is immersed in smoke flavor, which serves to apply a quantity of liquid flavor prior to the flavor injection line. The wire roller 62 provides better contact of the collagen casing with the liquid flavor in cup 60.

Figure 3:
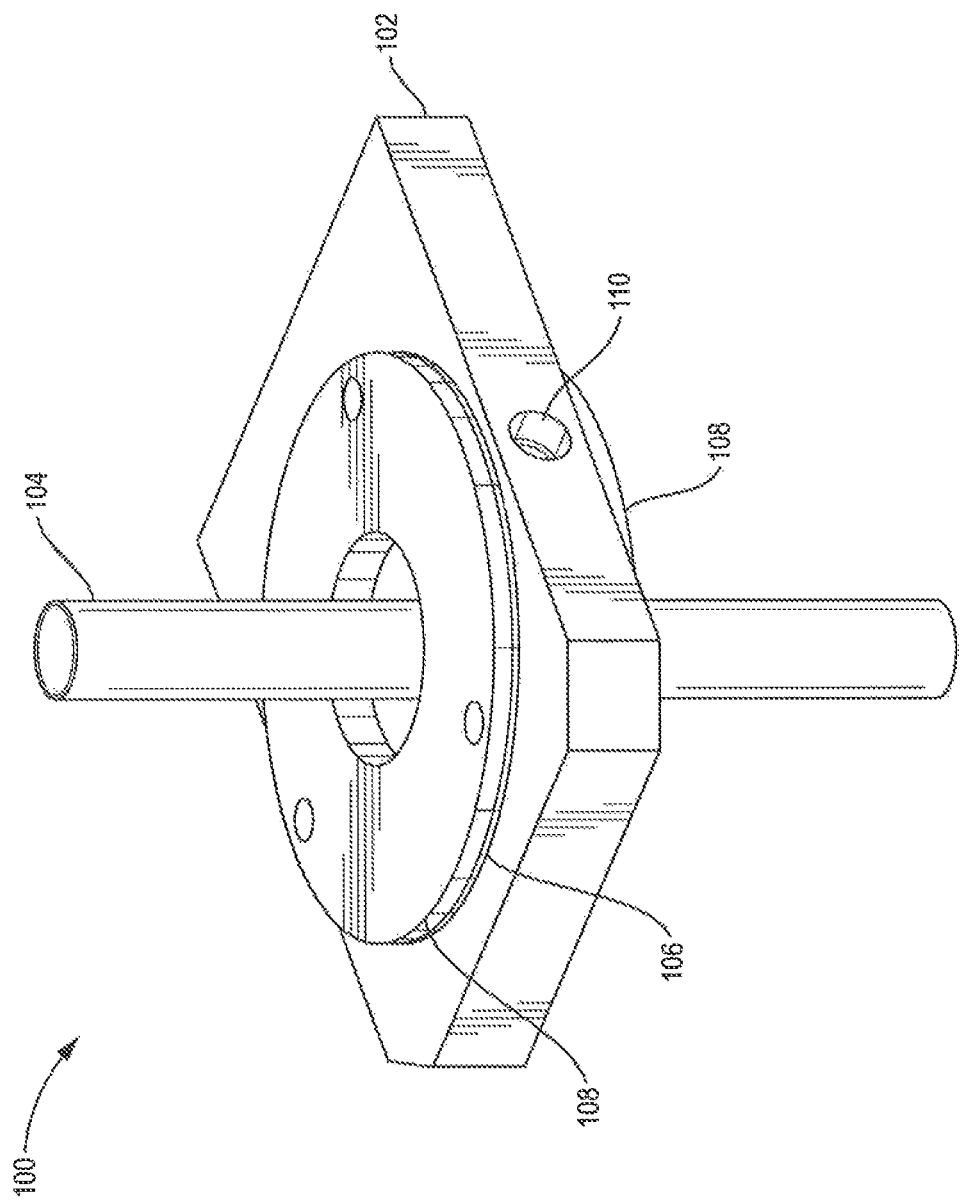
FIG. 3 is a diagram showing one embodiment of the applicator of FIG. 2.

One embodiment of an applicator for use in applying the smoke flavor is shown in FIG. 3. The applicator 100 is comprised of a base plate 102, a wiper 106, and a retention ring 108 which is bolted to the top of base plate 102 to hold the wiper 106 in place. A wiper and retention ring 108 is also provided on the bottom of the base plate 102.

In operation, the casing 104 is fed through the applicator 100 while smoke flavor is injected under pressure through port 110. Excess smoke flavor is wiped from the surface of the casing by the wipers 106 and travel to the drip cup as described previously. The wiper may be any appropriate material for applying liquid flavor and/or wiping the excess liquid flavor from the collagen casing. In one embodiment, the wiper is comprised of felt.

Figure 4:
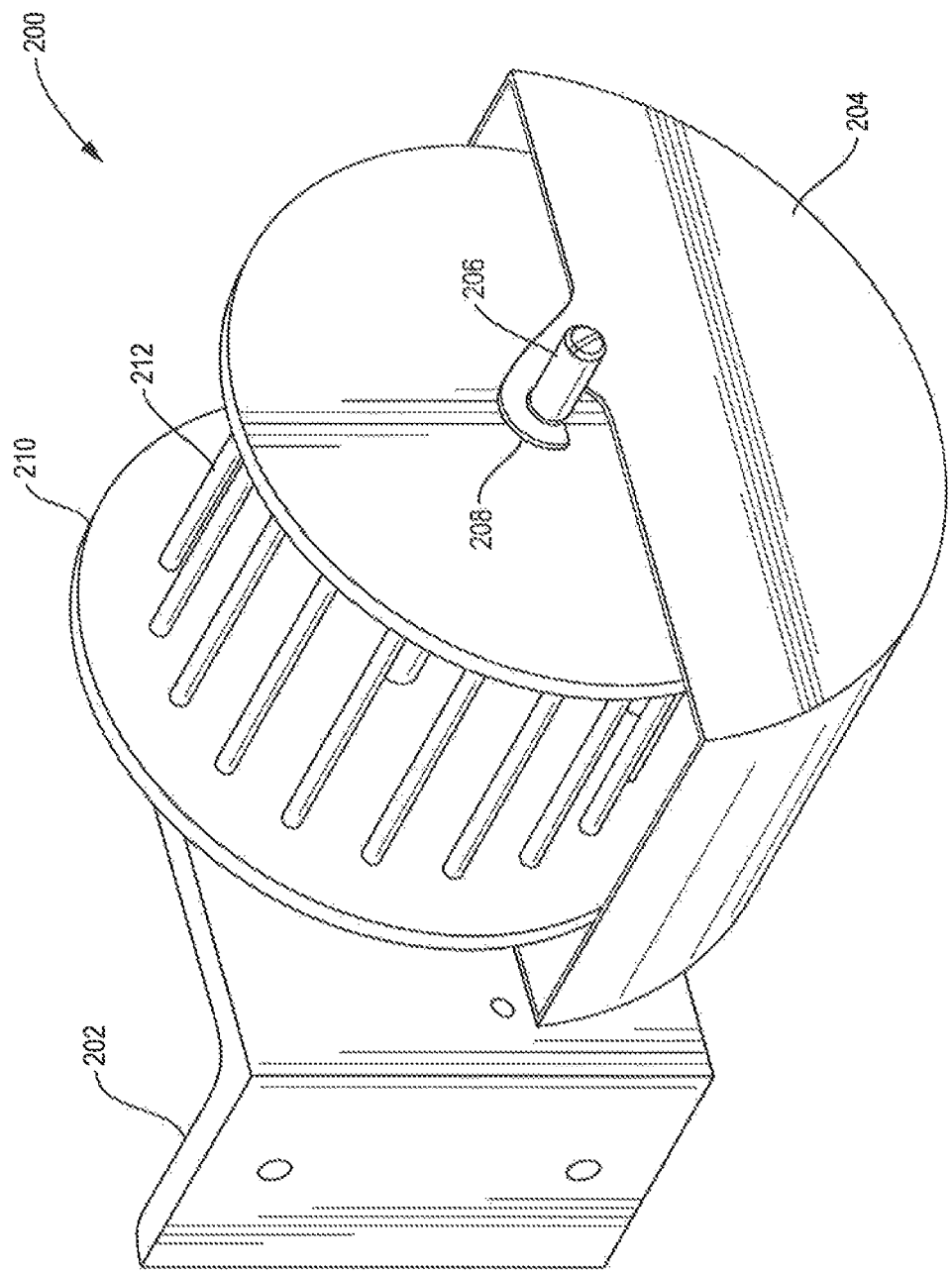
FIG. 4 is a diagram showing one embodiment of the drip cup of FIG. 2.

One embodiment of a drip cup for use in the present invention is shown in FIG. 4. The drip cup 200 is comprised of an attachment bracket 202 fixedly attached to a semi-circular cup 204 having an arm 208. A wire roller 210 is rotatably attached to the semi-circular cup 204 by bolt or screw 206. The wire roller comprises a plurality of wires 212.

In operation, as shown in FIG. 2, the casing is fed under the wire roller and into the drip cup, where it contacts the smoke flavor collected in the drip cup. The casing is then fed through the applicator, where excess smoke flavor is removed by the wipers.

In another embodiment of the invention, the smoke flavor is applied using only drip cup 60 and the wire roller 62. In this embodiment, the smoke flavor is supplied directly to the drip cup and the casing is fed through the drip cup where it is coated with smoke flavor as described above. In this embodiment, the applicator is not provided or used for application of the smoke flavor.

If desired, alternatively, the drip cup 60 may be removed from the wire roller 62, and the flavor is applied using only the applicator 58. This is particularly desirable where an oil based flavor solution is applied, as oil based flavors are preferably applied using only the applicator with felt wipers.

The liquid flavor applied to the collagen casing in this manner is retained in the casing throughout the process for stuffing the casing with meat emulsion. After the collagen casing is stuffed with the meat emulsion, it is typically dried for about 32 hours in an oven. The smoke flavor aroma is retained on the casing after stuffing and drying.

One skilled in the art will recognize that multiple extrusion preparation lines and multiple storage tanks for the gel product may be used to ensure a constant supply to the continuous extrusion line.

As will be recognized by those of ordinary skill in the pertinent art based on the teachings herein, numerous changes and modifications may be made to the above-described and other embodiments of the invention without departing from its scope. Accordingly, this detailed description of preferred embodiments is to be taken in an illustrative as opposed to a limiting sense.

We claim:

1. A device for applying liquid flavor to a collagen casing, comprising:
    (a) a roller feeding collagen casing having an outer surface,
    (b) a cup having liquid flavor contained therein,
    (c) a wire roller rotatably attached to the cup, wherein the collagen casing passes under the wire roller and through the liquid flavor contained in the cup,
    (d) a feed line for feeding the liquid flavor into the cup,
    (e) a liquid flavor applicator having a base plate with a first hole in the base plate to allow the collagen casing to pass through the base plate,
    (f) a second hole in the base plate in fluid communication with the first hole to inject liquid flavor through the second hole into contact with the collagen casing as it passes through the first hole,
    (g) a wiper removably attached to the base plate to wipe excess liquid flavor from the outer surface of the collagen casing, and
    (h) a liquid flavor injection line attached to the second hole in the base plate and wherein the collagen casing passes through the liquid flavor applicator after passing through the cup.

2. The device of claim 1, wherein the applicator comprises a felt wiper.

* * * * *